Feb. 28, 1928.
B. E. MITTERLING
1,660,391
FLOAT CONTROLLED VALVE
Filed May 27, 1927
2 Sheets-Sheet 1
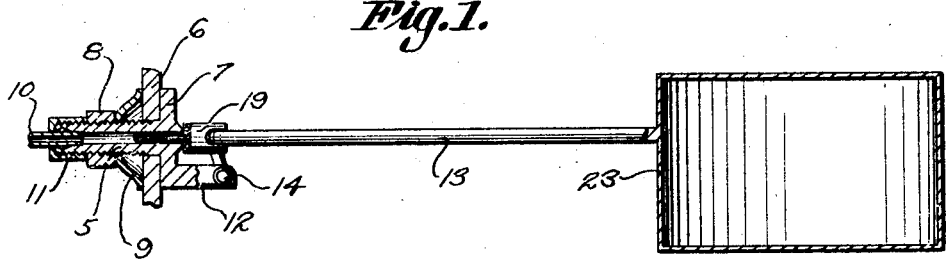
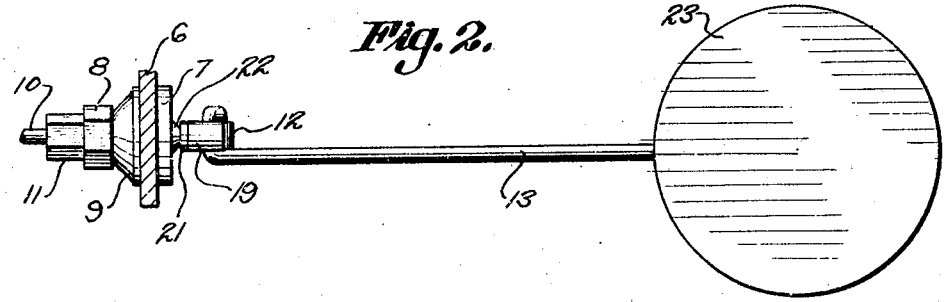
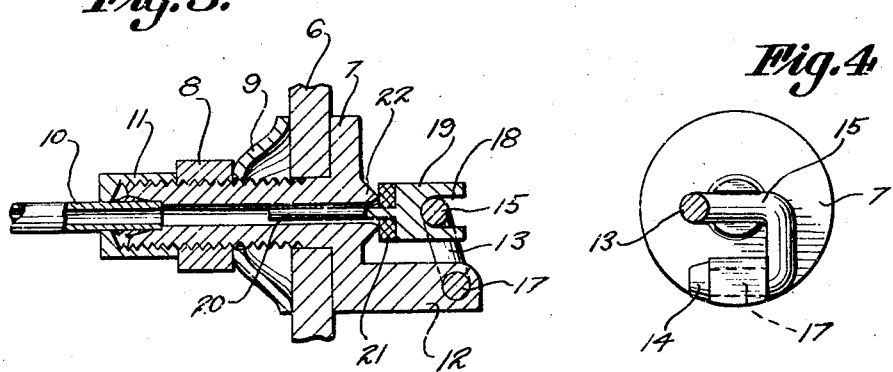
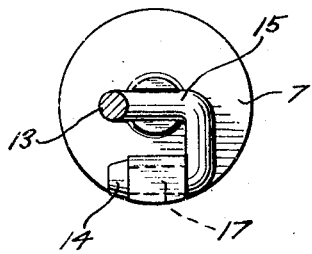
Birt E. Mitterling Inventor
By C. A. Snow & Co.
Attorneys

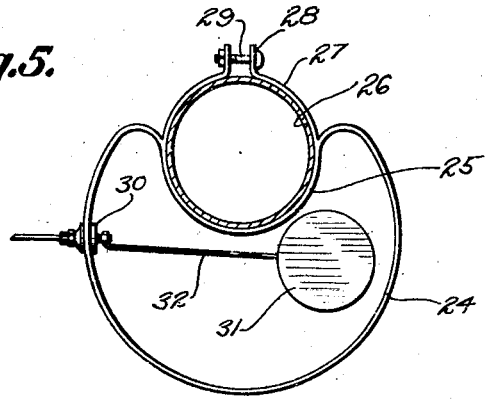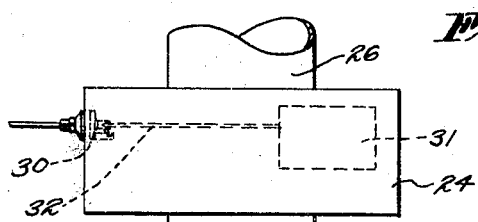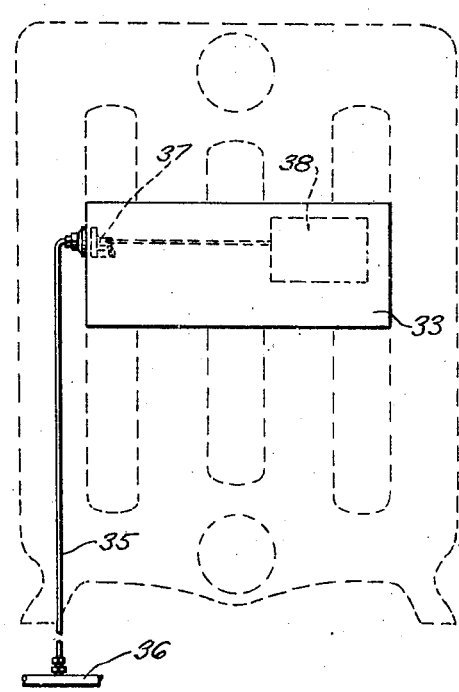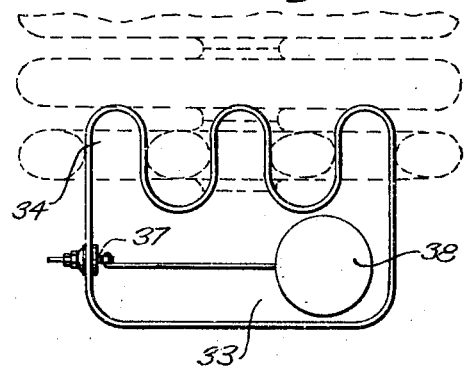

Patented Feb. 28, 1928.

1,660,391

UNITED STATES PATENT OFFICE.

BIRT E. MITTERLING, OF SUPERIOR, WISCONSIN.

FLOAT-CONTROLLED VALVE.

Application filed May 27, 1927. Serial No. 194,652.

This invention has reference to valve constructions and more particularly to float controlled valves, the primary object of the invention being to provide a valve the movable valve member of which will move in a true horizontal plane to control the passage of fluid therethrough, thereby reducing wear on the valve to the minimum.

Another object of the invention is to provide a valve of this character which may be readily and easily disconnected from the rod that operates the valve, and which has connection with the float.

A still further object of the invention is the provision of a valve which may be readily and easily positioned in a tank and connected with a supply pipe.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a longitudinal sectional view through a valve constructed in accordance with the invention.

Figure 2 is a plan view thereof.

Figure 3 is an enlarged sectional view through the valve.

Figure 4 is a sectional view taken on line 4—4 of Figure 1.

Figure 5 is a sectional view through a stove pipe and tank supported thereon, a valve constructed in accordance with the invention being supported therein.

Figure 6 is a side elevational view thereof.

Figure 7 is an elevational view illustrating the valve as supported within a vapor tank employed in connection with radiators.

Figure 8 is a plan view of the same, the cover of the tank being removed.

Referring to the drawings in detail, the valve forming the subject matter of this invention includes a threaded pipe section 5 which in operation is passed through an opening in the tank in which the valve is positioned, the tank being indicated by the reference character 6.

The pipe 5 is provided with a flange 7 that contacts with the tank adjacent to the opening and cooperates with the nut 8 mounted on the threaded portion of the pipe in clamping the valve in position, there being provided a washer 9 arranged between the nut 8 and the tank to insure a fluid-tight connection between the threaded pipe and tank.

The outer end of the pipe 5 receives one end of the supply pipe 10, which is held in position by means of the nut 11. Formed integral with the flange 7 is an extension 12 which is formed with an opening to accommodate one end of the rod 13 which is provided with a head 14 to secure the rod against displacement.

The rod 13 is formed with a right angled portion 15 that is spaced from the end 17 and fits within the cut out portion 18 of the head 19 of the valve. A guide 20 extends from the head 19 and slidably operates in the pipe 5 which guide or stem 20 also provides means for securing the washer 21 to the head, which washer is designed to move against the valve seat 22 that extends laterally from the flange 7.

The float is indicated by the reference character 23 and normally rests on the surface of the water to move with the rise and fall of the water in the tank in which the device is supported. From the foregoing it will be seen that the cut out portion 18 formed in the head 19 extends from one end of the head to a point substantially centrally thereof, to the end that by forcing the float downwardly to a point within the bottom of the tank in which the device is positioned, the rod and the right angled portion 15 will move from the cut out portion and the valve may be readily slid from its position within the pipe 5, thereby facilitating repair or replacement of the elements of the valve.

In the form of the invention as illustrated by Figures 5 and 6 of the drawings, a tank is indicated by the reference character 24, the same being formed with a curved portion 25 conforming to the curvature of a stove pipe, the stove pipe being indicated by the reference character 26.

The split band 27 forms a part of the tank and is provided with right angled end portions 28 formed with openings to receive the bolt 29 whereby the tank may be secured in position.

The valve is indicated at 30 and connects with one wall of the tank, the valve being of the type previously described and controlled by means of the float 31 and rod 32.

As shown by Figures 7 and 8, the valve is employed in connection with a vapor tank, the vapor tank being indicated by the reference character 33 and provided with extensions 34 that pass between the coils of the radiator, the tank being secured to the radiator by any suitable means.

The reference character 35 indicates the supply pipe which connects with the pipe 36 through which water passes in passing through the tank 33. Disposed within the vapor tank 33 is the valve 37 that is controlled by means of the float 38.

I claim:

1. A valve of the class described including a pipe section having a flange, said flange having a valve seat formed integral therewith, a movable head having an integral extension operating within the pipe section, said head having a cut out portion extending from one end thereof, a float actuated rod pivotally supported adjacent to the flange and having a right angled portion fitted in the cut out portion of the head, and said float actuated rod adapted to operate to close the valve.

2. A valve of the class described including a threaded pipe section, a flange formed integral therewith, a head having a reduced extension defining a guide, and fitted in the pipe section, a washer positioned over the reduced extension and resting against the head, a valve seat forming a part of the flange and against which the washer moves to control the passage of fluid through the extension, and a float actuated rod removably connected with the head and adapted to move the head in one direction.

3. A valve of the class described including a threaded pipe section, a flange formed integral therewith, a valve seat extending from the flange, an extension at the lower end of the flange and having an opening therein, a valve head, a guide extending from the valve head and operating within the pipe section, a washer positioned on the guide and contacting with the head for engaging the valve seat, and a float actuated rod connected with the valve head for moving the valve head towards its seat.

In testimony that I claim the foregoing as my own, I have hereto affixed my signature.

BIRT E. MITTERLING.